Jan. 14, 1958
D. L. WILKERSON
2,819,799
LOW PRESSURE DRAIN VALVE
Filed March 30, 1955
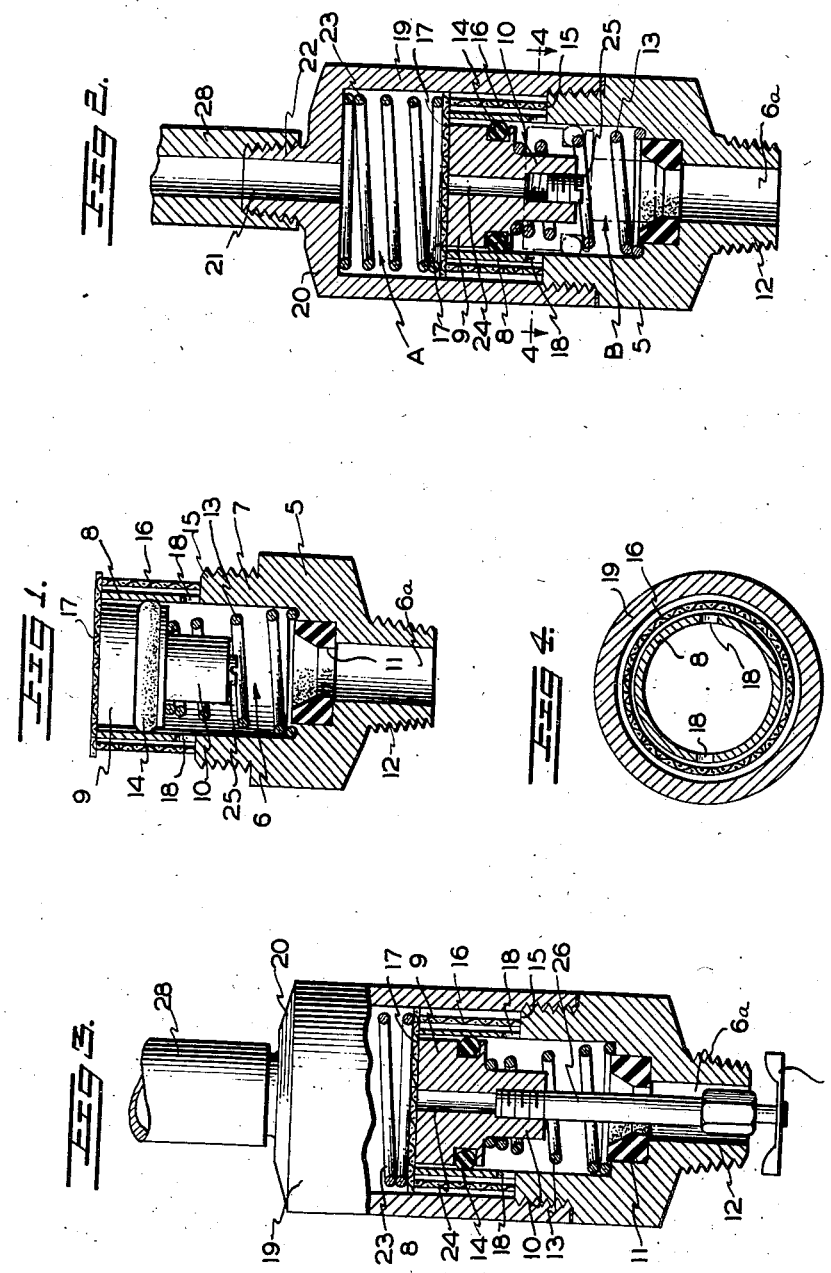
INVENTOR
DEWEY L. WILKERSON
BY
ATTORNEY

United States Patent Office 2,819,799
Patented Jan. 14, 1958

2,819,799

LOW PRESSURE DRAIN VALVE

Dewey L. Wilkerson, Denver, Colo., assignor to Wilkerson Corporation, Englewood, Colo., a corporation of Colorado Application March 30, 1955, Serial No. 497,835

1 Claim. (Cl. 210—430)

The present invention relates to drain valves of the type employed for low pressure draining of moisture and contaminants from compressed air applications and fluids during low pressure and zero pressure periods.

Such valves have proved troublesome in service. As the draining occurs at very low and finally zero pressures it happens at times that sediment and sludge deposits prevent complete closing of a valve, so that a leakage occurs that is difficult to prevent. Another objectionable characteristic of such valves is their lack of sensitivity in regard to the differential between the pressure at which they open and the pressure at which they reclose.

The valve assembly of the present invention is designed to overcome and avoid the prior art difficulties and disadvantages, and to provide a valve unit of simple and sturdy construction that is highly sensitive in regard to opening and closing pressures and in which the regulation of such pressures is easily accomplished.

Another object of the invention is to provide a valve assembly of the character described having means to assure a positive seal for the valve when closed irrespective of the hindrance of sediment or sludge deposits.

Other and incidental objects will be apparent from the following description taken in conjunction with the accompanying drawings, in which:

Figure 1 is an axial sectional view centrally through the basic valve unit of the present invention;

Figure 2 is a view similar to Fig. 1 with an added housing element, and illustrating in dotted lines the disposition of the valve parts when the valve is closed;

Figure 3 is a view similar to Fig. 2 but illustrating the employment of an optional auxiliary drain for manual control;

Figure 4 is a section taken on the line 4—4 of Fig. 2.

The valve assembly of the present invention includes a basic unit as shown in Fig. 1, which comprises a substantially cylindrical plug body 5 having an axial bore 6 therethrough from end to end. The upper half of the body is diametrically reduced to provide an intermediate externally threaded attaching portion 7 and is further diametrically reduced thereabove to provide a cylinder extension 8. The bore 6 is uniform in diameter throughout the combined axial extent of the extension 8 and the attaching portion 7, and receives a vertically reciprocable piston 9 having a depending axial stem 10 which, at its lower end, constitutes a valve head for seating against a seat 11 when the valve is closed. This seat 11 is preferably an annular gasket of resilient material positioned against a shoulder constituting the bottom of a mounting recess formed in the valve body by a diametrical reduction of the valve bore. That portion of the valve bore below the seat 11 is further diametrically reduced to provide a discharge passage 6a. The lower end portion of the valve body also is diametrically reduced and externally threaded to constitute a discharge nipple 12. An expansion coil spring 13 surrounds the piston stem 10 with its upper end engaging the under face of the piston and with its lower end seated against an internal annular shoulder in the valve body around the top of the seat 11. Spring 13 normally holds the piston in elevated position as shown in Fig. 1, with the valve head at the bottom of the stem 10 raised above and off the seat 11, so that the valve is biased open. The piston 9 has a loose fit in the cylinder 8 but is sealed relative thereto by an O-ring 14 of suitable packing material disposed in a mounting groove in the piston head in the conventional manner of such packings.

An annular shoulder 15 at the upper end of the attaching portion 7 provides a base which supports a tubular strainer 16 externally of and concentric with the cylinder extension 8. A strainer disc 17 of slightly larger diameter than the tube 16 seats on its upper end, covering the upper end of the tube and overlying the upper face of the piston 9. The diameter of the strainer tube is slightly larger than the outer diameter of the cylinder extension 8 to provide clearance therebetween, and the base of the cylinder extension is formed with a pair of diametral drain ports 18 opening through the cylinder wall just above the strainer support shoulder 15. It is a feature of the invention that the total area of the combined openings 18 is always substantially smaller than the area of the opening through the valve seat 11 and discharge passage 6a. The strainer tube 16 and disc 17 are made of reticulated material, preferably wire gauze, and are united by welding so that together they form an inverted cup-shaped cage which houses and encompasses the cylinder 8 and the piston 9.

When the basic unit is to be used alone, as in installations wherein the portion 7 is attached directly into the bottom of a compressed air tank or sump, not shown, the bottom end of the strainer tube 16 is rigidly attached to the shoulder 15 by any suitable means so that the strainer cage acting through the disc 17 provides a stop defining the limit of upward travel of the piston 9.

The basic unit above described may be used alone or it may constitute the lower part of a two-part assembly as shown in Fig. 2. In such case, the attaching portion 7 is connected into the internally threaded lower end of a cylindrical housing 19 having a closed upper head 20 provided with an axial drain passage 21 extending therethrough and through an externally threaded attaching nipple 22 integral therewith. The housing 19 has an axial bore of a diameter sufficient to provide a free sliding fit over the strainer disc 17 which is inserted therein when the basic unit is coupled to the housing.

If desired, the strainer tube 16 may be seated loosely on the supporting shoulder 15, in which case the strainer cage is retained in proper position by an expansion spring 23 bearing at one end against the housing head 20 and at its other end against the strainer disc 17.

When the parts are assembled as shown in Fig. 2, the piston 9 constitutes a movable wall that divides the interior of the casing formed by the body 5 and the housing 19 into an upper or inlet chamber A and a lower or outlet chamber B. Normally, when the valve is open with the piston held by the spring 13 in fully elevated position against the strainer disc 17, these chambers are in communication through the openings 18, because in this position of the piston its seal ring 14 is spaced above the zone of the openings. When the valve is closed, as shown in dotted line in Fig. 2, the seal ring 14 is disposed below the openings 18 so that communication between the chambers is cut off, and the valve head at the lower end of the piston stem 10 is closed against the seat 11 thus closing off the discharge passage 6a.

The piston 9 and its stem 10 have an axial drain passage 24 extending entirely therethrough to provide a secondary communication between the chambers A and B. This passage is intended for use only when service conditions are such that manual draining is a necessary precedent to normal automatic pressure operation of the valve. When the valve is employed with installations which do not require a preliminary manual draining the passage 24 is sealed off by a closure plug 25 screw threaded into its lower end. Where preliminary manual draining is necessary, the plug 25 is replaced by a drain cock fitting 26, as shown in Fig. 3, operated from a handle 27 disposed externally of the discharge passage 6a. The drain cock fitting is so dimensioned that it extends through the valve seat 11 and passage 6a with ample clearance, so that its presence does not impair or interfere with automatic operation of the valve. It may, if desired, replace the plug 25 as a permanent part of the assembly.

In service: if only the basic unit is to be used the attaching portion 7 is coupled directly into the outlet of a sump or container to be drained, so that all parts of the unit above and including the openings 18 are exposed within the space to be drained; if the two-part assembly is to be used the attaching nipple 22 is coupled to a drain line or other discharge outlet 28. In all cases the valve, if closed, opens in response to the bias of the spring 13 beneath the piston 9 whenever service conditions are such that pressure acting on the relatively large area of the top face of piston 9 becomes less than the force exerted by the spring 13. When the valve opens any accumulation of condensed moisture and contaminants above and around the openings 18 drains through these openings into the valve chamber below the piston and through the open valve seat 11 and passage 6a to the atmosphere externally of the valve. The valve is held open by the spring 13, which is stronger than spring 23, and drainage continues until the pressure acting on the top face of the piston becomes strong enough to overcome the spring 13 and force the piston down in its cylinder to reclose the valve.

This reclosing or resetting pressure, as a practical matter, need only be from one to three pounds more than the pressure at which the valve opens. This is because it is impossible to build up pressure in the chamber below the piston as the capacity of the ports 18 leading to the space below the piston is much smaller than the capacity of the discharge passage 6a. Even though pressure is discharged rapidly into the chamber below the piston through the ports 18, no pressure can build up in this chamber because the opening of the discharge passage through the seat 11 is much larger than the opening of the two ports 18 combined. Therefore, as only the pressure on the top face of the piston is exerted against the piston, this insures the opening and reclosing of the discharge passage 6a at approximately the same pressure. The opening and closing can be accomplished at approximately any pressure desired by using the proper strength spring 13. The sensitivity of accurate opening and resetting pressures is increased, as well as sturdiness and surety of operation, by increasing the piston area in ratio to the area of opening in the valve seat.

The seal ring 14 is so positioned on the movable wall comprising the piston 9 that when the piston is forced down to close the valve on the seat 11 the ring passes beneath the ports 18 and seals them off from the discharge chamber below the piston, before the valve closes on the seat. This insures the closing off of the discharge passage 6a even though if for any reason the valve head fails to seat properly.

It is obvious, in the case of the two-part assembly, that the housing 19 constitutes a container to be drained in the same sense that a sump or air tank is a container to be drained, because the large chamber A within the housing is also a walled space in which condensed moisture and contaminants collect; so that the basic unit in its attaching portion 7 is adapted for connection into a container to be drained both when it is used alone and when it is connected into the bottom of the housing 19. In all cases the top face of the piston 9 is exposed to and subject to the ambient pressure existing in the space to be drained.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claim.

I claim:

In a drain valve, a body having an attaching portion adapted for connection into an enclosed space to be drained, a cylinder extension on and above said attaching portion, said body having an axial bore entirely therethrough from top to bottom and including the cylinder, the lower end of said bore constituting a drain discharge passage, a piston reciprocable in the cylinder and closing the upper end of said bore, the upper face of the piston being exposed to and subject to ambient fluid pressure in a space to be drained, a stem depending from said piston and constituting a valve controlling the discharge passage in response to travel of the piston, a drain port through the cylinder wall above the body attaching portion and below the piston when the piston is at its upward travel limit, a spring biasing the piston to its upper travel limit, a strainer cage on the attaching portion of said body and enclosing the upper end of the cylinder and the drain port in the cylinder wall and providing a stop defining the upper travel limit of the piston, said piston being responsive to ambient pressure in excess of the biasing force of said spring for travel to a lower travel limit to close the discharge passage control valve in opposition to the force of said spring, a valve seat in the lower end portion of said axial bore and surrounding said drain discharge passage for closing engagement by the piston stem valve, said piston and stem having an axial secondary drain passage therethrough opening at its upper end to the top face of the piston and opening at its lower end through said valve seat into said drain discharge passage when the piston stem valve is closed on the seat, a drain cock fitting connected into the lower end of said secondary drain passage and extending downwardly with ample clearance through the valve seat and the drain discharge passage to a point externally below the valve body when the piston is at its upper travel limit, and means on the external end of the drain cock fitting for manual opening and closing thereof.

References Cited in the file of this patent

UNITED STATES PATENTS

| 809,077 | Roehl | Jan. 2, 1906 |
| 922,578 | Gries | May 25, 1909 |
| 996,600 | Stotts | June 27, 1911 |
| 1,060,142 | Stevens | Apr. 29, 1913 |
| 1,171,959 | Keith | Feb. 15, 1916 |
| 1,548,008 | Joyce | July 28, 1925 |
| 2,136,898 | Thomas | Nov. 15, 1938 |
| 2,512,877 | Rike | June 27, 1950 |
| 2,621,885 | Schmitt | Dec. 16, 1952 |

FOREIGN PATENTS

| 706,674 | Great Britain | Mar. 31, 1954 |